(12) United States Patent
Koyama et al.

(10) Patent No.: US 10,484,660 B2
(45) Date of Patent: Nov. 19, 2019

(54) IMAGE PROCESSING METHOD AND DISPLAY DEVICE

(71) Applicant: Semiconductor Energy Laboratory Co., Ltd., Atsugi-shi, Kanagawa-ken (JP)

(72) Inventors: Jun Koyama, Kanagawa (JP); Mai Akiba, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 0 days.

(21) Appl. No.: 16/010,600

(22) Filed: Jun. 18, 2018

(65) Prior Publication Data

US 2018/0309973 A1    Oct. 25, 2018

Related U.S. Application Data

(63) Continuation of application No. 15/091,622, filed on Apr. 6, 2016, now Pat. No. 10,051,255, which is a
(Continued)

(30) Foreign Application Priority Data

Mar. 25, 2011    (JP) .................. 2011-067069

(51) Int. Cl.
*G06K 9/00*        (2006.01)
*H04N 13/122*      (2018.01)
(Continued)

(52) U.S. Cl.
CPC ........... *H04N 13/122* (2018.05); *G06T 19/20* (2013.01); *G09G 3/003* (2013.01); *G09G 5/003* (2013.01);
(Continued)

(58) Field of Classification Search
CPC combination set(s) only.
See application file for complete search history.

(56) References Cited

U.S. PATENT DOCUMENTS 5,732,204 A    3/1998    Fukushima et al.
5,852,673 A    12/1998   Young
(Continued)

FOREIGN PATENT DOCUMENTS

JP    05-091545 A    4/1993
JP    08-036145 A    2/1996
(Continued)

OTHER PUBLICATIONS

Noda.M et al., "Cosmos: Convenient Image Retrieval System of Flowers for Mobile Computing Situations", IPSJ SIG Technical Report, Nov. 15, 2001, vol. 2001, No. 108, pp. 9-14, Information Processing Society of Japan.

*Primary Examiner* — Alex Kok S Liew
(74) *Attorney, Agent, or Firm* — Fish & Richardson P.C.

(57) ABSTRACT

An image processing method to obtain a high sense of depth or high stereoscopic effect for an image and a display device utilizing the method are provided. Image data of an image is separated into image data of a plurality of objects and a background. A feature amount is obtained from the image data of each object, so that the objects are identified. The relative distance between viewer's eye and any of the objects is determined by the data of the sizes of the objects in the image and the sizes of the objects stored in the database. The image data of each object is processed so that an object with a shorter relative distance is enlarged. The image data of each object after image processing is combined with the image data of the background, so that a sense of depth or stereoscopic effect of an image is increased.

13 Claims, 11 Drawing Sheets

Related U.S. Application Data continuation of application No. 13/427,086, filed on Mar. 22, 2012, now Pat. No. 9,313,479.

(51) Int. Cl.

| | |
|---|---|
| *H04N 13/139* | (2018.01) |
| *H04N 13/156* | (2018.01) |
| *H04N 13/31* | (2018.01) |
| *H04N 13/341* | (2018.01) |
| *G06T 19/20* | (2011.01) |
| *G09G 3/00* | (2006.01) |
| *G09G 5/00* | (2006.01) |
| *H04N 13/00* | (2018.01) |

(52) U.S. Cl.
CPC ......... *H04N 13/139* (2018.05); *H04N 13/156* (2018.05); *H04N 13/31* (2018.05); *H04N 13/341* (2018.05); *G06T 2219/2016* (2013.01); *G09G 2340/0464* (2013.01); *H04N 2013/0081* (2013.01)

(56) References Cited

U.S. PATENT DOCUMENTS

| | | | |
|---|---|---|---|
| 6,064,391 A | 5/2000 | Sano et al. | |
| 6,466,255 B1 | 10/2002 | Kagita et al. | |
| 6,741,755 B1* | 5/2004 | Blake | G06T 5/30 |
| | | | 382/257 |
| 6,873,723 B1 | 3/2005 | Aucsmith et al. | |
| 7,023,013 B2 | 4/2006 | Ricks et al. | |
| 7,057,339 B2 | 6/2006 | Boroson et al. | |
| 7,348,978 B2 | 3/2008 | Nagata et al. | |
| 7,471,849 B2 | 12/2008 | Peterson | |
| 7,664,338 B2 | 2/2010 | Zhou | |
| 7,777,413 B2 | 8/2010 | Kuma et al. | |
| 8,009,903 B2 | 8/2011 | Ojima et al. | |
| 8,841,653 B2 | 9/2014 | Shitagaki et al. | |
| 2002/0126897 A1 | 9/2002 | Ueda et al. | |
| 2003/0058939 A1* | 3/2003 | Lee | H04N 7/147 |
| | | | 375/240.08 |
| 2003/0152285 A1 | 8/2003 | Feldmann et al. | |
| 2003/0202696 A1 | 10/2003 | Simard | |
| 2003/0202697 A1* | 10/2003 | Simard | G06K 9/00456 |
| | | | 382/195 |
| 2004/0057602 A1 | 3/2004 | Kondo et al. | |
| 2004/0120581 A1 | 6/2004 | Ozer et al. | |
| 2004/0252889 A1* | 12/2004 | Liu | G06K 9/00201 |
| | | | 382/190 |
| 2005/0002572 A1 | 1/2005 | Saptharishi et al. | |
| 2005/0207644 A1 | 9/2005 | Kitagawara et al. | |
| 2006/0115231 A1 | 6/2006 | Ishida | |
| 2007/0110298 A1* | 5/2007 | Graepel | G06K 9/00355 |
| | | | 382/154 |
| 2007/0201853 A1 | 8/2007 | Petschnigg | |
| 2007/0269108 A1* | 11/2007 | Steinberg | G06K 9/00234 |
| | | | 382/173 |
| 2007/0279494 A1 | 12/2007 | Aman et al. | |
| 2008/0208547 A1* | 8/2008 | Kim | G06T 7/536 |
| | | | 703/2 |
| 2008/0297621 A1 | 12/2008 | Sun et al. | |
| 2009/0022396 A1 | 1/2009 | Watanabe et al. | |
| 2009/0080729 A1 | 3/2009 | Zhang et al. | |
| 2010/0181906 A1 | 7/2010 | Kuma et al. | |
| 2011/0221756 A1 | 9/2011 | Inoue et al. | |
| 2011/0228981 A1 | 9/2011 | Harres et al. | |

FOREIGN PATENT DOCUMENTS

| | | |
|---|---|---|
| JP | 2002-247436 A | 8/2002 |
| JP | 2003-259395 A | 9/2003 |
| JP | 2006-154169 A | 6/2006 |
| JP | 2007-533076 | 11/2007 |
| JP | 2008-033897 A | 2/2008 |
| JP | 2008-503871 | 2/2008 |
| JP | 2010-206362 A | 9/2010 |
| JP | 2011-009729 A | 1/2011 |
| WO | WO-2005/098987 | 10/2005 |
| WO | WO-2006/009612 | 1/2006 |
| WO | WO-2006/098188 | 9/2006 |
| WO | WO-2010/137509 | 12/2010 |

* cited by examiner

FIG. 3A   Image included in the image data 103 before image processing
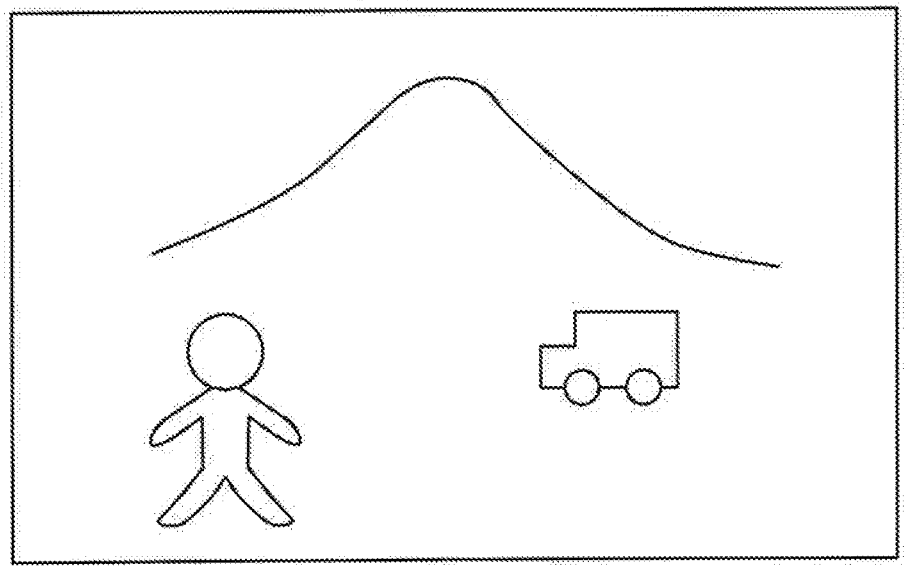
FIG. 3B
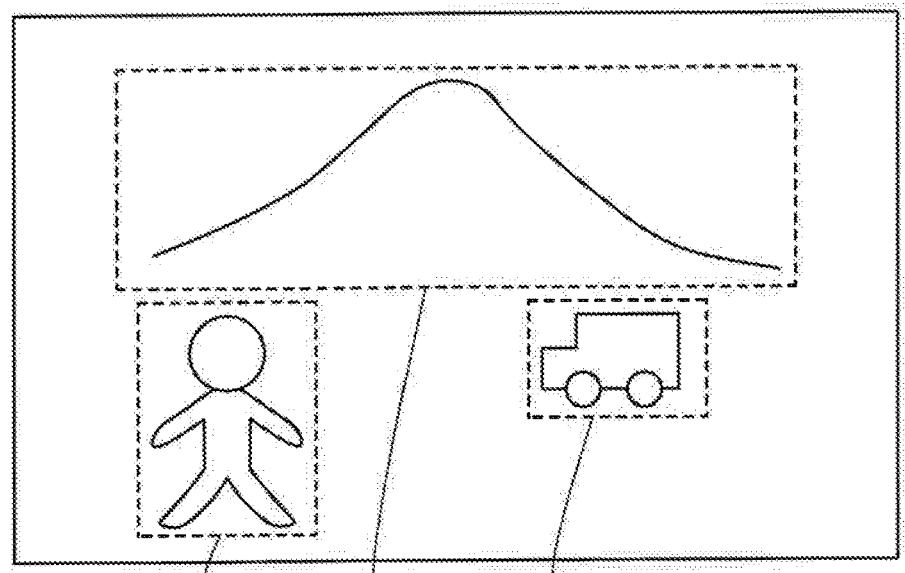

IMAGE PROCESSING METHOD AND DISPLAY DEVICE

CROSS-REFERENCE TO RELATED APPLICATIONS

This application is a continuation of U.S. application Ser. No. 15/091,622, filed Apr. 6, 2016, now allowed, which is a continuation of U.S. application Ser. No. 13/427,086, filed Mar. 22, 2012, now U.S. Pat. No. 9,313,479, which claims the benefit of a foreign priority application filed in Japan as Serial No. 2011-067069 on Mar. 25, 2011, all of which are incorporated by reference.

BACKGROUND OF THE INVENTION

1. Field of the Invention

One embodiment of the present invention relates to an image processing method and a display device utilizing the image processing method.

2. Description of the Related Art

The market for three-dimensional display devices is growing. Displaying a three-dimensional image can be achieved by artificially creating, with a display device, difference between retinal images of both eyes (binocular parallax) which may occur when a viewer sees a stereoscopic object with both eyes. The three-dimensional image display devices utilizing the binocular parallax have been developed and commercialized with a variety of display methods. The variety of display methods is mainly classified into a direct-view display method utilizing an optical system such as a parallax barrier, a lenticular lens, or a microlens array and a display method utilizing glasses with shutters.

Patent Document 1 discloses a technique for displaying a three-dimensional image by a parallax barrier so that a right eye sees an image for the right eye and a left eye sees an image for the left eye. Patent Document 2 discloses a liquid crystal display device that displays three-dimensional images utilizing glasses.

REFERENCE

Patent Document

[Patent Document 1] Japanese Published Patent Application No. H8-036145
[Patent Document 2] Japanese Published Patent Application No. 2003-259395

SUMMARY OF THE INVENTION

In a three-dimensional image display method utilizing an optical system such as a parallax barrier, a lenticular lens, or a microlens array, light from a pixel that corresponds to a right eye enters a right eye and light from a pixel that corresponds to a left eye enters a left eye. Consequently, the number of pixels that contribute to image display, in the horizontal direction of a pixel portion, is reduced to half of the actual number, which prevents high-definition images from being displayed.

In a three-dimensional image display method utilizing glasses, an image for a right eye and an image for a left eye are alternately displayed on a screen. By seeing the images through glasses with shutters, human eyes recognize that the images are three-dimensional. In the three-dimensional image display device, as compared to the two-dimensional image display device, the number of writing operations of images to a pixel portion during one frame period is increased; accordingly, a high-performance driver circuit that is capable of driving at high frequency is needed and power consumption of the whole display device is increased.

In view of the above problems, one embodiment of the present invention provides an image processing method and a display device utilizing the image processing method. In the image processing method, a sense of depth or stereoscopic effect of images is increased while the number of writing of images to a pixel portion during one frame period is reduced or the number of pixels that contribute to image display is not reduced.

One embodiment of the present invention utilizes human perception of perspective: in the case where a plurality of objects exists in a two-dimensional image and an object is enlarged more than the other objects, the object seems to be located more on the front side than the other objects. In the description, a front side of an image is a part of the image that a viewer will perceive as closer from him than a back side of the image. Further, in the description, distances may have to be understood as "distances perceived by a viewer" or "intended perceived distances by a user" according to the context.

Specifically, in an image processing method according to one embodiment of the present invention, image data is separated into image data of a plurality of objects and image data of a background. A feature amount is obtained from the image data of each object. A feature amount is obtained by converting features, which are useful for object recognition of the object into values, and objects can be identified by the feature amount. For example, a feature amount obtained from a shape, a color, a gray scale, texture, or the like of an object can be used for identification of the object. Then, each of the feature amounts is compared with data, stored in database, of the size of an object that is a model correlated with the feature amount of the object that is a model, so that data of the size of each object is obtained. A relative distance between viewer's eye and any of the objects or a front-back relation among the objects can be determined by the data of the size of each object obtained from the database and the relative sizes of the objects in the image. Then, the image data of each object is processed so that an object that has a shorter relative distance from viewer's eye or an object that is located more on the front side is enlarged. Then, the image data of each object after image processing is combined with the image data of the background, so that image data in which a sense of depth or stereoscopic effect of an image is increased is obtained.

Further, one embodiment of the present invention utilizes human perception of perspective: in the case where a plurality of objects exists in a two-dimensional image, the outline of an object is reinforced compared to the outlines of the other objects, so that the object seems to be located more on the front side than the other objects.

Specifically, in an image processing method according to one embodiment of the present invention, like the above-described image processing method, a relative distance between viewer's eye and any of the objects or a front-back relation among the objects is determined. Then, the image data of each object is processed so that the outline of an object that has a shorter relative distance from viewer's eye or an object that is located more on the front side is reinforced. Then, similarly to the above-described image processing method, the image data of each object after image processing is combined with the image data of the background, so that image data in which a sense of depth or stereoscopic effect of an image is increased is obtained.

Further, one embodiment of the present invention may utilize human perception of perspective: in the case where a plurality of objects exists in a two-dimensional image, a vanishing point is assumed to be in the two-dimensional image, and an object is located apart from the vanishing point, so that the object seems to be located more on the front side than the other objects.

Specifically, an image processing method according to one embodiment of the present invention may obtain image data in which a sense of depth or stereoscopic effect of an image is increased by a method in which, like the above described image processing method, the image data of each object is processed, an object in which a relative distance from viewer's eye is shorter or an object that is located more on the front side is moved to be located apart from the vanishing point, and the image data of each object after image processing is combined with the image data of the background.

An image processing method and a display device utilizing the image processing method according to one embodiment of the present invention are not like a method and a display device utilizing binocular parallax for example, in which a sense of depth or stereoscopic effect of an image is obtained by difference between an image data for a right eye and an image data for a light eye. That is, with the above-described image processing method and the above-described display device utilizing the image processing method, even in the case where one eye sees an image formed, a human can feel a sense of depth or stereoscopic effect. Accordingly, a method in one embodiment of the present invention, unlike a method utilizing the binocular parallax, does not necessary to display an image for a right eye and an image for a left eye alternately or simultaneously, therefore, a sense of depth or stereoscopic effect of the image can be increased while the number of writing of images to a pixel portion during one frame period is reduced or the number of pixels that contribute to image display is not reduced.

BRIEF DESCRIPTION OF THE DRAWINGS

In the accompanying drawings:
FIGS. 3A and 3B each show an example of an image.

DETAILED DESCRIPTION OF THE INVENTION

Hereinafter, embodiments of the present invention are described in detail with reference to the drawings. Note that the present invention is not limited to the following description and it is easily understood by those skilled in the art that the mode and details can be various changed without departing from the scope and spirit of the present invention. Accordingly, the present invention should not be construed as being limited to the description of the embodiments below.

(Embodiment 1)

A display device according to one embodiment of the present invention is described with reference to FIG. 1.

Figure 1:
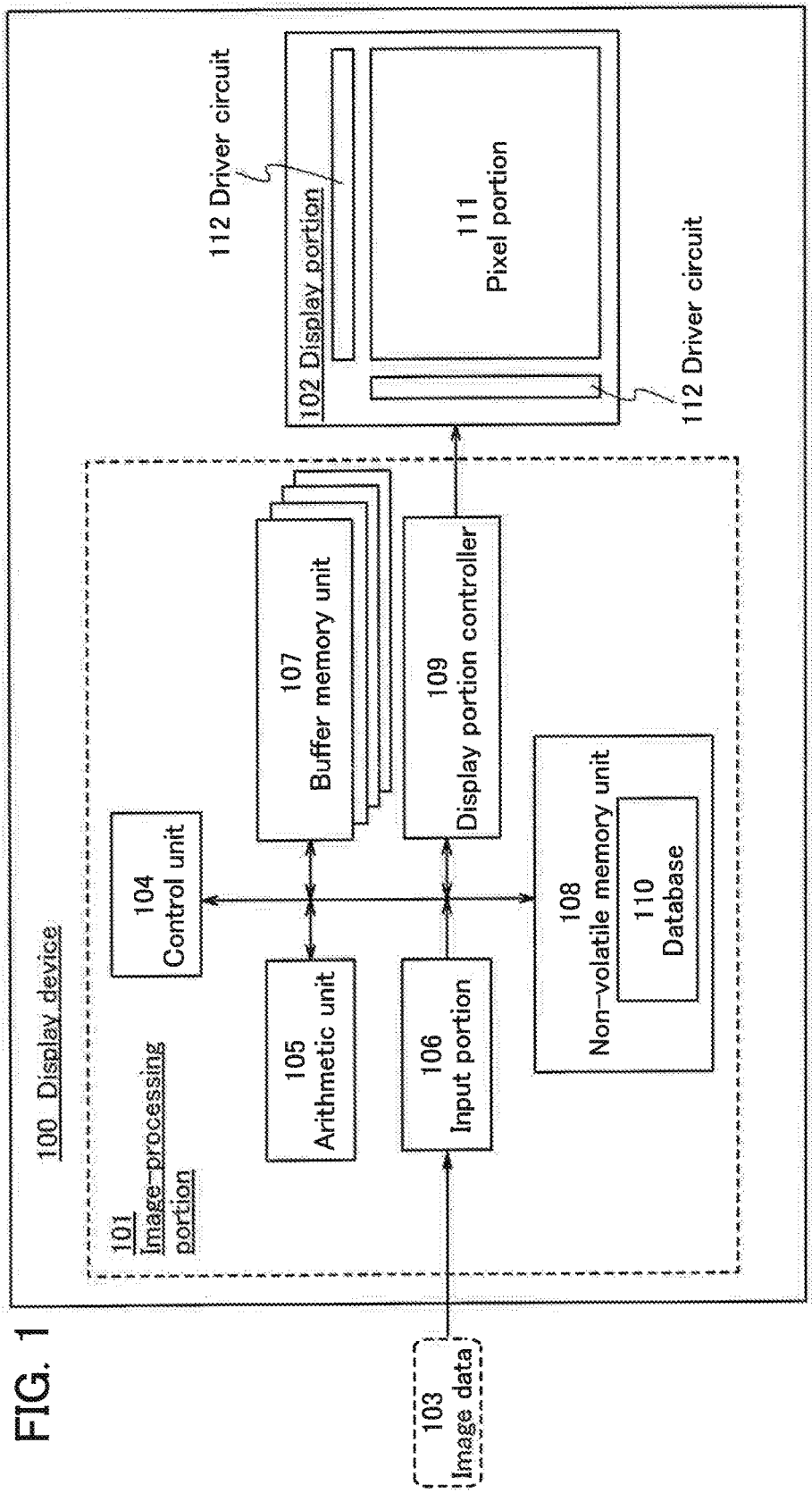
FIG. 1 is a block diagram showing a configuration of a display device.

As shown in FIG. 1, a display device 100 according to one embodiment of the present invention includes an image-processing portion 101 and a display portion 102. The image-processing portion 101 processes an image data 103 input to the display device 100, and generates an image signal. The display portion 102 displays an image according to the image signal.

The image-processing portion 101 shown in FIG. 1 includes a control unit 104, an arithmetic unit 105, an input portion 106, a buffer memory unit 107, a nonvolatile memory unit 108, a display portion controller 109, and the like.

The control unit 104 is a circuit that controls all operations of the arithmetic unit 105, the input portion 106, the buffer memory unit 107, the nonvolatile memory unit 108, and the display portion controller 109 that are included in the image-processing portion 101.

The arithmetic unit 105 is a logic circuit that performs arithmetic operations such as logic operations, four arithmetic operations, and the like.

The input portion 106 is an interface that converts a format for the image data 103 that is input to the display device 100 into a format for the display device 100.

The nonvolatile memory unit 108 includes a database 110. The database 110 is a group of data in which a feature amount used for identification of an object (object recognition) and data of the size of an object that is a model are correlated with each other. Further, a variety of data used for an arithmetic operation in the arithmetic unit 105, an instruction that is carried out in the control unit 104, and the like are stored in the nonvolatile memory unit 108.

The buffer memory unit 107 has a function of storing a variety of data temporarily. Specifically, the buffer memory unit 107 may include a data cache, an instruction cache, a program counter, an instruction register, and a resister file. The data cache temporarily stores frequently used data. The instruction cache temporarily stores a frequently used instruction of instructions (programs) sent to the control unit 104. The program counter stores an address of an instruction to be carried out next by the control unit 104. The instruction register stores an instruction to be carried out next by the control unit 104. The resister file stores data read from the nonvolatile memory unit 108, data obtained during an arithmetic operation in the arithmetic unit 105, data obtained by an arithmetic operation in the arithmetic unit 105, or the like.

The control unit 104 decodes an instruction input from the buffer memory unit 107, and controls all operations of the arithmetic unit 105, the input portion 106, the buffer memory unit 107, the nonvolatile memory unit 108, and the display portion controller 109 according to the instruction decoded, and processes the image data 103 that is input to the image-processing portion 101.

The display portion controller 109 generates an image signal to specifications of the display portion 102 with the use of the image data 103 that is processed. The image signal generated is supplied to the display portion 102. The display portion controller 109 has a function of supplying a driving signal, such as a start pulse signal or a clock signal, for controlling driving of the display portion 102 or a power supply potential to the display portion 102.

The display portion 102 includes a pixel portion 111 that displays an image with the use of an image signal and a driver circuit 112 that controls operation of the pixel portion 111. A device displaying an image by controlling a gray scale of each pixel (e.g., a liquid crystal display device, a light-emitting device containing a light-emitting element such as an organic light-emitting element (OLED), electronic paper, a digital micromirror device (DMD), a plasma display panel (PDP), or a field emission display (FED)) can be used for the display portion 102.

Next, an image processing method, which is performed in the display device 100 shown in FIG. 1, according to one embodiment of the present invention is described.

Figure 2:
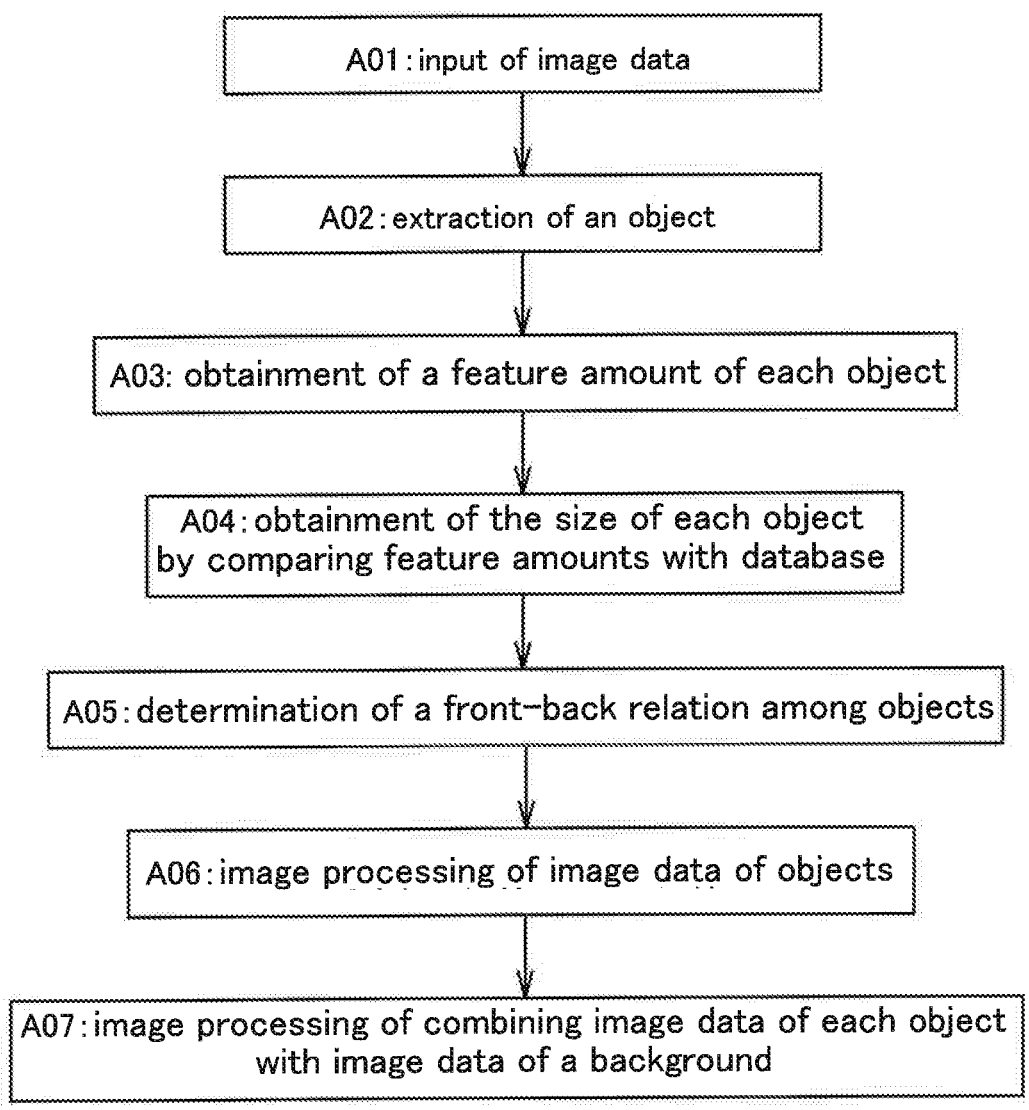
FIG. 2 shows an image processing procedure.

FIG. 2 shows an example of an image processing procedure according to one embodiment of the present invention. First, as shown in FIG. 2, the image data 103 is input to the image-processing portion 101 (A01: input of image data). FIG. 3A shows an example of an image that is included in the image data 103 before image processing.

The image data 103 may correspond to a full-color image or a monochrome image. In the case where the image data 103 corresponds to a full-color image, a plurality of image data for each hue is included in the image data 103.

Note that in this specification, a full-color image refers to an image displayed with gray scales of a plurality of colors having different hues. In addition, a monochrome image refers to an image displayed with a gray scale of a color having a single hue.

In the image-processing portion 101, an object included in the image data 103 that is input to the image-processing portion 101 is extracted (A02: extraction of an object). An object can be extracted by extracting the outline of an object. By the extraction of the object, the image data 103 is separated into image data of the object and image data of a background. FIG. 3B shows an example in which an object A, an object B, and an object C are extracted from an image included in the image data 103 shown in FIG. 3A.

Then, each of the feature amounts of the objects extracted is obtained (A03: obtainment of a feature amount of each object). A feature amount is obtained by converting features that are useful for object recognition of the object into values. A feature amount obtained from a shape, a color, a gray scale, texture, or the like can be used for object recognition. A known method can be used for obtaining a feature amount. For example, in the case where a feature amount is obtained from a shape, feature points included in the outline of an object are extracted, and the positions of the feature points are used as a feature amount. Alternatively, feature points included in the outline of a component of an object are extracted, and the positions of the feature points are used as a feature amount.

Note that when an outline is assumed to include numerous outline points, an outline point where a slope of a tangent line markedly changes may be extracted as a feature point. Alternatively, in the case where outline points that have equal slopes of tangent lines are continuously present, one of the outline points may be extracted as a feature point.

Figure 5:
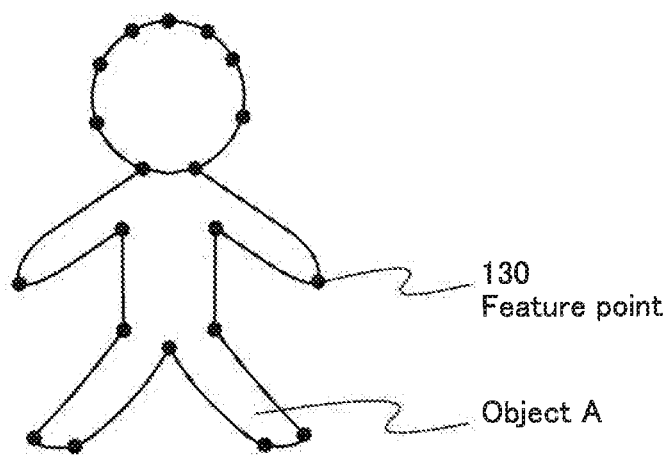
FIG. 5 shows an object A and feature points thereof.

FIG. 5 shows an object A and a plurality of feature points 130 extracted from the outline of the object A. FIG. 5 illustrates the case where, among outline points forming the outline of the object A, only outline points where a slope of a tangent line markedly changes are extracted as feature points.

Note that one or more kinds of feature amounts may be used for object recognition of the object. Accuracy of object recognition can be increased with the use of a plurality of kinds of feature amounts.

Then, each of the obtained feature amounts of the objects is compared with the database 110, so that the size of each object is obtained (A04: obtainment of the size of each object by comparing feature amounts with database). For example, in the case where the object A is a human, data of a human size can be obtained by comparing the feature amounts with the database 110.

Note that even in the case where several objects are recognized as the same object, the sizes of the objects have individual variability in some cases. In the case where the sizes of the objects have individual variability, data with a wide range of sizes or data with an averaged size may be prepared in the database 110.

Even in the case where an object does not exist (e.g., product of human imagination), it is possible that the sizes of the objects are set by a designer as appropriate, and the data of the size is prepared in the database 110.

The data of the size of an object stored in the database 110 may be data of the length, the width, the area, or the like of the object or a component included in the object.

The data of the size of each of the plurality of objects is obtained, and is compared with the size of each object in the image data 103 for determining a front-back relation among the objects (A05: determination of a front-back relation among objects). For example, when the ratio of a size $D_1$ of an object in the image data 103 to a size $D_0$ of an object obtained from the database 110 is higher than the ratio of $D_1$ to $D_0$ of the other objects, the object is determined to be located more on the front side than the other objects.

In the case of the image data shown in FIG. 3B, the object A has the highest ratio of $D_1$ to $D_0$ and the object C has the lowest ratio of $D_1$ to $D_0$. Accordingly, the object A is located on the front side, the object B is located more on the back side than the object A, and the object C is located more on the back side than the object B.

Note that when a front-back relation among the objects is determined, the image data 103 may be assumed to have perspective, and the ratio of a relative distance between viewer's eye and any of the objects may be calculated. The position of viewer's eye can be determined by a designer as appropriate.

Then, image data of each of the objects in the image data 103 is processed, so that the outlines of the objects that are located on the front side are exaggerated and the objects that are located on the front side are enlarged (A06: image processing of image data of objects). The more an object is located on the front side, the more the outline of the object is reinforced. Further, the more an object in the image data 103 is located on the front side, the more the object is enlarged.

Figure 4A:
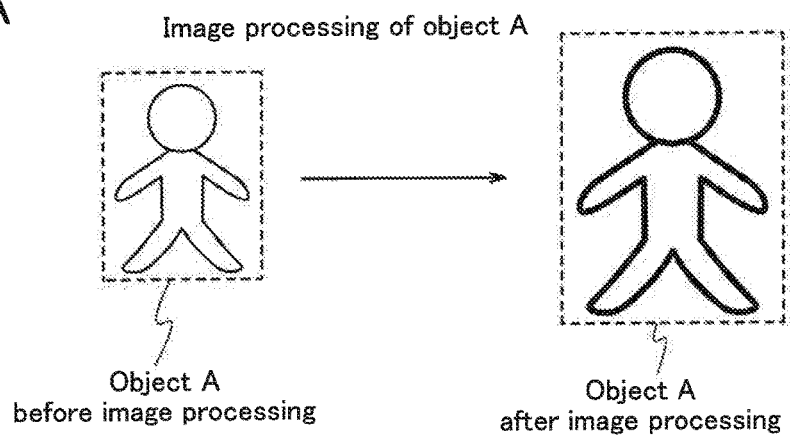
FIGS. 4A to 4C each show an example of an image.
Figure 4B:
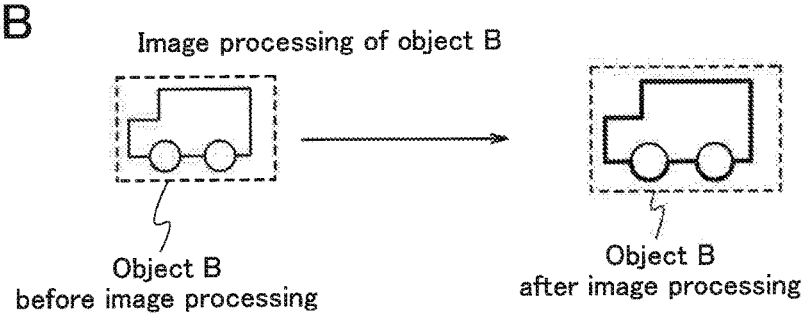

FIG. 4A illustrates an object A before image processing and an object A after image processing. As shown in FIG. 4A, the outline of the object A is reinforced and the object A is enlarged by the image processing. Further, FIG. 4B illustrates an object B before image processing and an object B after image processing. As shown in FIG. 4B, the outline of the object B is reinforced and the object B is enlarged by the image processing. Note that the outline of the object A that is located more on the front side than the object B is more reinforced than the outline of the object B, and the magnification rate of the object A is higher than that of the object B.

The degree of the exaggeration of the outline and the magnification rate can be determined in advance according to the order of the objects in the front-back relation. The degree of the exaggeration of the outline and the magnification rate of the object are considered in the case where m objects exist in image data (m is a natural number of 2 or more) and the positions of the objects are different from each other in terms of the front-back relation. For example, the outline of the object that is in the m th position from the front side, which is an object located on the back side, is not reinforced, or the object is not enlarged. The degree of the exaggeration of the outline or the magnification rate of the object that is in the (m−1) th position from the front side is t times that of the object in the am th position (t is 1 or more). The degree of the exaggeration of the outline or the magnification rate of the object which is in the (m−2) th position from the front side is $t^2$ times that of the m th object. The degree of the exaggeration of the outline or the magnification rate of the object which is in the (m−3) th position from the front side is $t^3$ times that of the m th object. In this manner, in accordance with the order of the objects, the more an object is located on the front side, the higher the degree of the exaggeration of the outline or the magnification rate of the object is. In the case of such a structure, the degree of the exaggeration of the outline of the object which is n th from the front side (n is a natural number of 2 or more and m or less) or the magnification rate thereof can be $t^{(m-n)}$.

Alternatively, the degree of the exaggeration of the outline and the magnification rate can be determined by a relative distance between viewer's eye and any of the objects.

Then, the image data of each object after image processing is combined with the image data of the background (A07: image processing of combining image data of each object with image data of a background). In this embodiment, image processing for obtaining stereoscopic vision (e.g., exaggeration of an outline or enlargement of a size) is not performed on the object that is located on the back side among the other objects; however, the image processing may be performed on the image data of the object that is located on the back side.

Figure 4C:
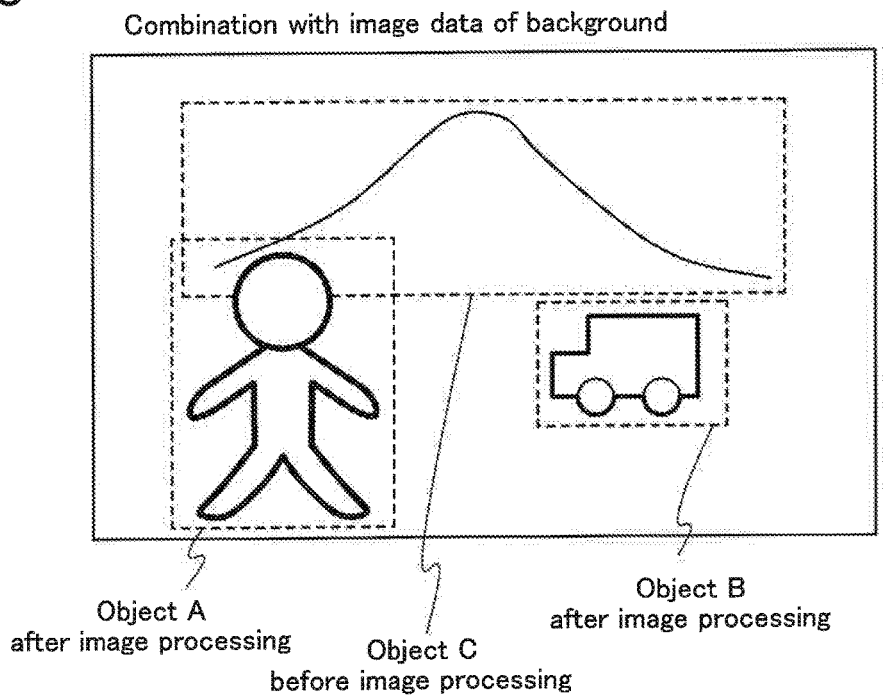

FIG. 4C shows an image included in image data obtained by combining the data of the object C and the background on which image processing is not performed and the data of the objects A and B shown in FIGS. 4A and 4B, respectively, on which image processing is performed.

By the image processing method, image data with an increased sense of depth or increased stereoscopic effect can be obtained.

Note that in the above-described steps A06 (image processing of image data of objects) and A07 (image processing of combining image data of objects with image data of a background), a known interpolating process such as linear interpolation or the nearest-neighbor interpolation may be used.

Further, in the step A06 (image processing of image data of objects located on a front side), an image before image processing is similar to an image after image processing. In an embodiment of the present invention, in the step A07 (image processing of combining image data of objects with image data of a background), the data of the object after image processing may be combined with the image data of the background so that the center of the similarity is inside the object before image processing; or the center of the similarity may be at the other positions.

In the latter case, for example, a vanishing point is assumed to be in the image included in the image data 103 before image processing. The object after image processing is located so that the center point of an object after image processing is located to be on a line connecting the center point of an object before image processing and the vanishing point and the distance between the center point of the object after image processing and the vanishing point is longer than the distance between the center point of the object before image processing and the vanishing point. Further, when an object is located more on the front side, the distance between the center point of an object before image processing and the center point of the object after image processing is lengthened.

Figure 6A:
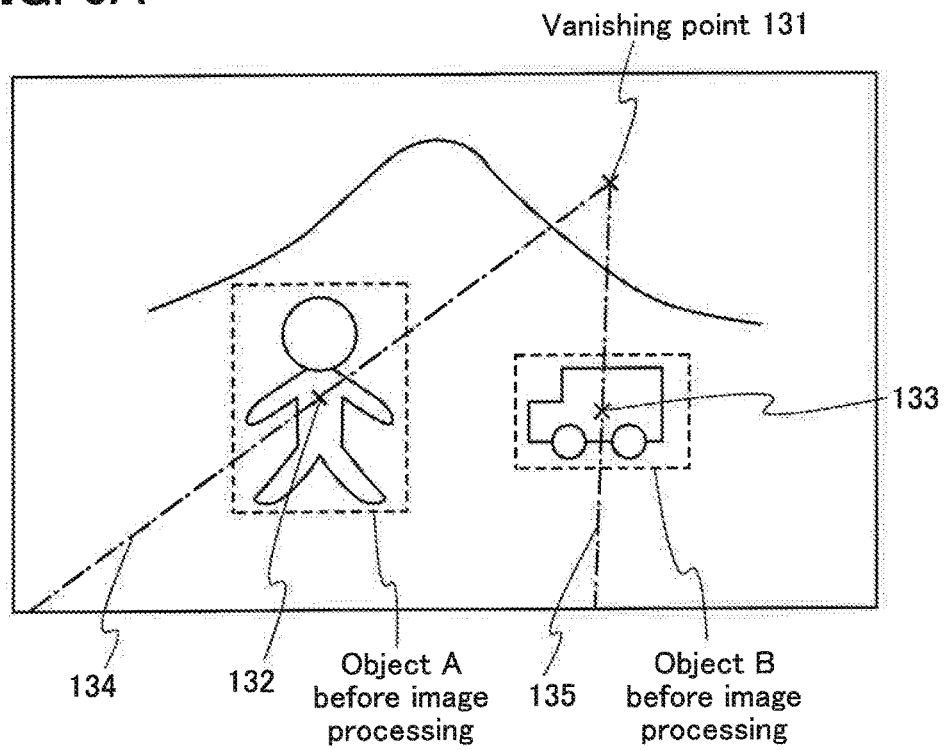
FIGS. 6A and 6B each show an example of an image.

FIG. 6A illustrates the case where a vanishing point 131 is provided in an image included in the image data 103 before image processing. Further, a center point 132 corresponds to a center of gravity of the object A before image processing, and a center point 133 corresponds to a center of gravity of the object B before image processing. A dashed and dotted line 134 connects the vanishing point 131 and the center point 132, and a dashed and dotted line 135 connects the vanishing point 131 and the center point 133.

Figure 6B:
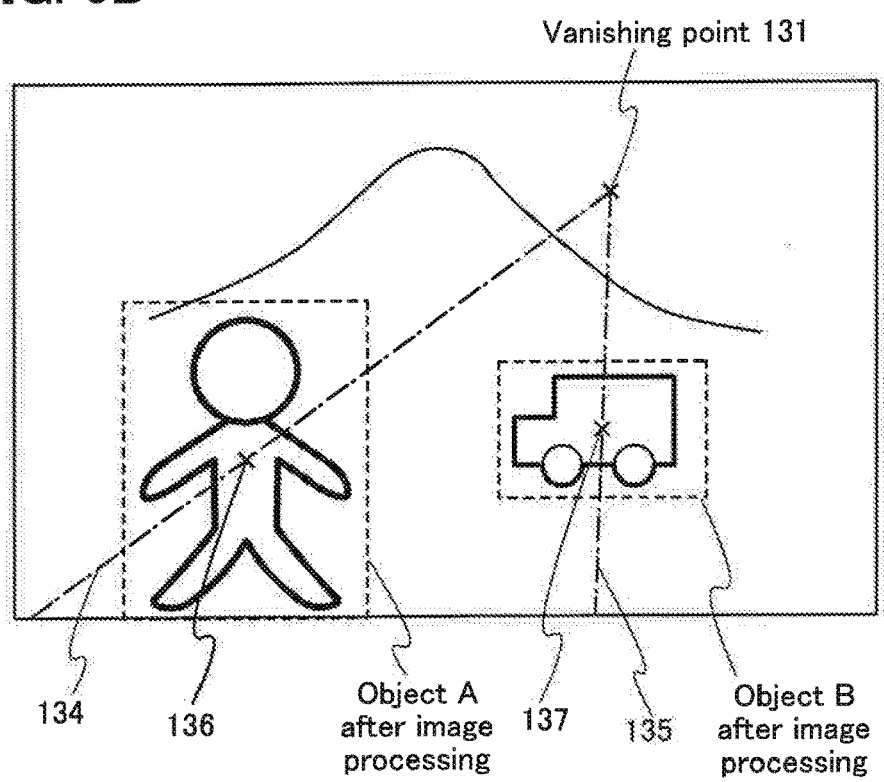

FIG. 6B corresponds to an image included in image data obtained by combining the data of the object A after image processing, the data of the object B after image processing, and the data of the background. A center point 136 corresponds to a center of gravity of the object A after image processing, and is located on the dashed and dotted line 134. The distance between the vanishing point 131 and the center point 136 is longer than the distance between the vanishing point 131 and the center point 132. A center point 137 corresponds to a center of gravity of the object B after image processing, and is located on the dashed and dotted line 135. The distance between the vanishing point 131 and the center point 137 is longer than the distance between the vanishing point 131 and the center point 133.

With such a structure, when the center point of an object is located more on the front side, the distance between the vanishing point and the center point of the object is longer; therefore, the object seems to be located more on the front side than the other objects. Accordingly, a sense of depth or stereoscopic effect of an image can be increased.

Note that FIGS. 6A and 6B illustrate the case where the center points of gravity of the objects are assumed to be the center points thereof and positions of the objects after image processing are determined; however, the positions of the center points of the objects are not limited thereto as long as they are inside of the objects. Thus, a designer can determine the positions of the center points as appropriate.

(Embodiment 2)

A light-emitting element such as an organic light-emitting element is a display element that emits light when supplied with current, and thus has a high contrast ratio. Accordingly, when a light-emitting device with the light-emitting element is used as a display portion of a display device according to one embodiment of the present invention, an image with a high sense of depth or high stereoscopic effect can be displayed.

Figure 7:
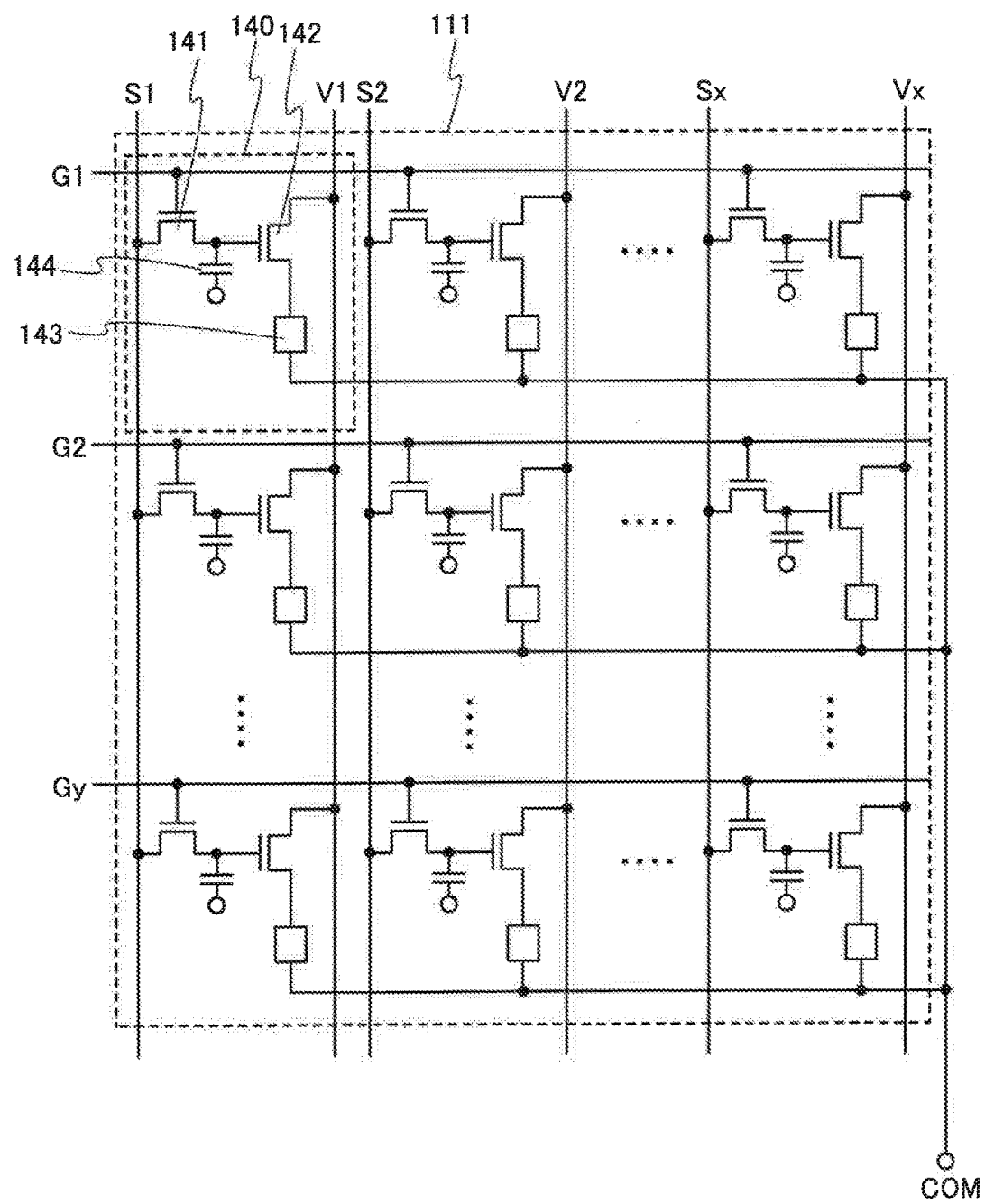
FIG. 7 is a circuit diagram of a pixel portion.

In this embodiment, the structure of the pixel portion 111 is described in the case where a light-emitting device is used as the display portion 102 in the display device 100 according to one embodiment of the present invention shown in FIG. 1. FIG. 7 is an example of a specific circuit diagram of the pixel portion 111.

Note that the names of the source terminal and the drain terminal of a transistor interchange depending on the polarity of the transistor or a difference between the levels of potentials applied to the electrodes. In general, in an n-channel transistor, an electrode to which a low potential is applied is called a source terminal, and an electrode to which a high potential is applied is called a drain terminal. Further, in a p-channel transistor, an electrode to which a low potential is applied is called a drain terminal, and an electrode to which a high potential is applied is called a source terminal. Hereinafter, one of a source electrode and a drain electrode is a first terminal and the other is a second terminal, and a structure of the pixel portion 111 is described below.

In addition, "source terminal" of a transistor means a source region that is a part of an active layer or a source electrode connected to an active layer. Similarly, "drain terminal" of a transistor means a drain region that is a part of an active layer or a drain electrode connected to an active layer.

Note that "connection" in this embodiment means electrical connection and corresponds to the state in which current, voltage, or a potential can be supplied or transmitted. Accordingly, a connection state means not only a state of direct connection but also a state of indirect connection through a circuit element such as a wiring, a resistor, a diode, or a transistor so that current, a potential, or voltage can be supplied or transmitted.

In addition, even when different components are connected to each other in a circuit diagram, there is actually a case where one conductive film has functions of a plurality of components such as a case where part of a wiring serves as an electrode. As used herein, "connection" in this embodiment includes the case where one conductive film has functions of a plurality of elements.

As shown in FIG. 7, the pixel portion 111 includes signal lines S1 to Sx, scan lines G1 to Gy, and power supply lines V1 to Vx. A pixel 140 has one of the signal lines S1 to Sx, one of the scan lines G1 to Gy, and one of the power supply lines V1 to Vx.

In each of the pixels 140, a transistor 141 has a gate electrode connected to the scan line Gj (j is one of 1 to y). The transistor 141 has a first terminal connected to the signal line Si (i is one of 1 to x) supplied with an image signal, and a second terminal connected to the gate electrode of a transistor 142. The transistor 142 has a first terminal connected to the power supply line Vi supplied with a power supply potential, and a second terminal connected to the pixel electrode of a light-emitting element 143.

A common potential COM is supplied to the common electrode of the light-emitting element 143.

FIG. 7 illustrates the case where the pixel 140 includes a storage capacitor 144. The storage capacitor 144 is connected to a gate electrode of the transistor 142. The storage capacitor 144 retains the potential of the gate electrode of the transistor 142. Specifically, one of electrodes of the storage capacitor 144 is connected to the gate electrode of the transistor 142 and the other is connected to a node supplied with a fixed potential, e.g., the power supply line Vi.

FIG. 7 illustrates the case where the transistor 141 and the transistor 142 are n-channel transistors; however, each of the transistors may be either an n-channel transistor or a p-channel transistor.

Further, the pixel 140 may further have another circuit element such as a transistor, a diode, a resistor, a storage capacitor, or an inductor as needed.

Note that the transistor 141 includes at least a gate electrode on one side of an active layer. Alternatively, the transistor 141 may include a pair of gate electrodes with the active layer interposed therebetween. In the case where the transistor 141 includes a pair of gate electrodes with the active layer interposed therebetween, one of the gate electrodes is connected to a signal line, and the other of the gate electrodes (back gate electrode) may be in a floating state (i.e., electrically isolated) or may be supplied with a potential from other elements. In the latter case, potentials at the same level may be applied to the pair of electrodes, or a fixed potential such as a ground potential may be applied only to the back gate electrode. The level of the potential applied to the back gate electrode is controlled, so that the threshold voltage of the transistor 141 can be controlled.

In addition, the transistor 141 may be either a single-gate transistor that includes a single gate electrode and a single channel formation region, or a multi-gate transistor that includes a plurality of gate electrodes electrically connected to each other and thus includes a plurality of channel formation regions.

Next, an operation of the pixel portion 111 shown in FIG. 7 is described.

First, during the write period, the scan lines G1 to Gy are sequentially selected. For example, the scan line Gj is selected and the transistor 141 that has a gate electrode connected to the scan line Gj is turned on. Since the transistors 141 are turned on, the potentials of image signals that have been input to the signal lines S to Sx are supplied to the gate electrodes of the corresponding transistors 142. Then, when the selection of the scan line Gj is terminated, the transistor 141 is turned off, and the potential of the image signal is held in the gate electrode of the transistor 142.

Note that during the write period, the common potential COM is supplied to the common electrodes of the light-emitting elements 143. The light-emitting state of the light-emitting element 143 is determined by the potential of the image signal. Specifically, if the transistors 142 are on in accordance with the potentials of the image signals, the light-emitting elements 143 are supplied with current, and then emit light. The amount of current supplied to the light-emitting elements 143 greatly depends on the drain current of the transistor 142. Thus, the luminance of the light-emitting elements 143 is determined by the potential of the image signal. In contrast, if the transistors 142 are off in accordance with the potentials of the image signals, supply of current to the light-emitting elements 143 is not performed, so that the light-emitting elements 143 do not emit light.

Next, the write period is finished and the holding period is started, so that the transistor 141 is turned off. Then, the potential of the image signal that has been supplied to the gate electrode of the transistor 142 during the write period is retained by the storage capacitor 144. Accordingly, the light-emitting element 143 maintains a light-emitting state determined during the write period.

With the above-described operation, the pixel portion 111 can display an image.

Figure 8:
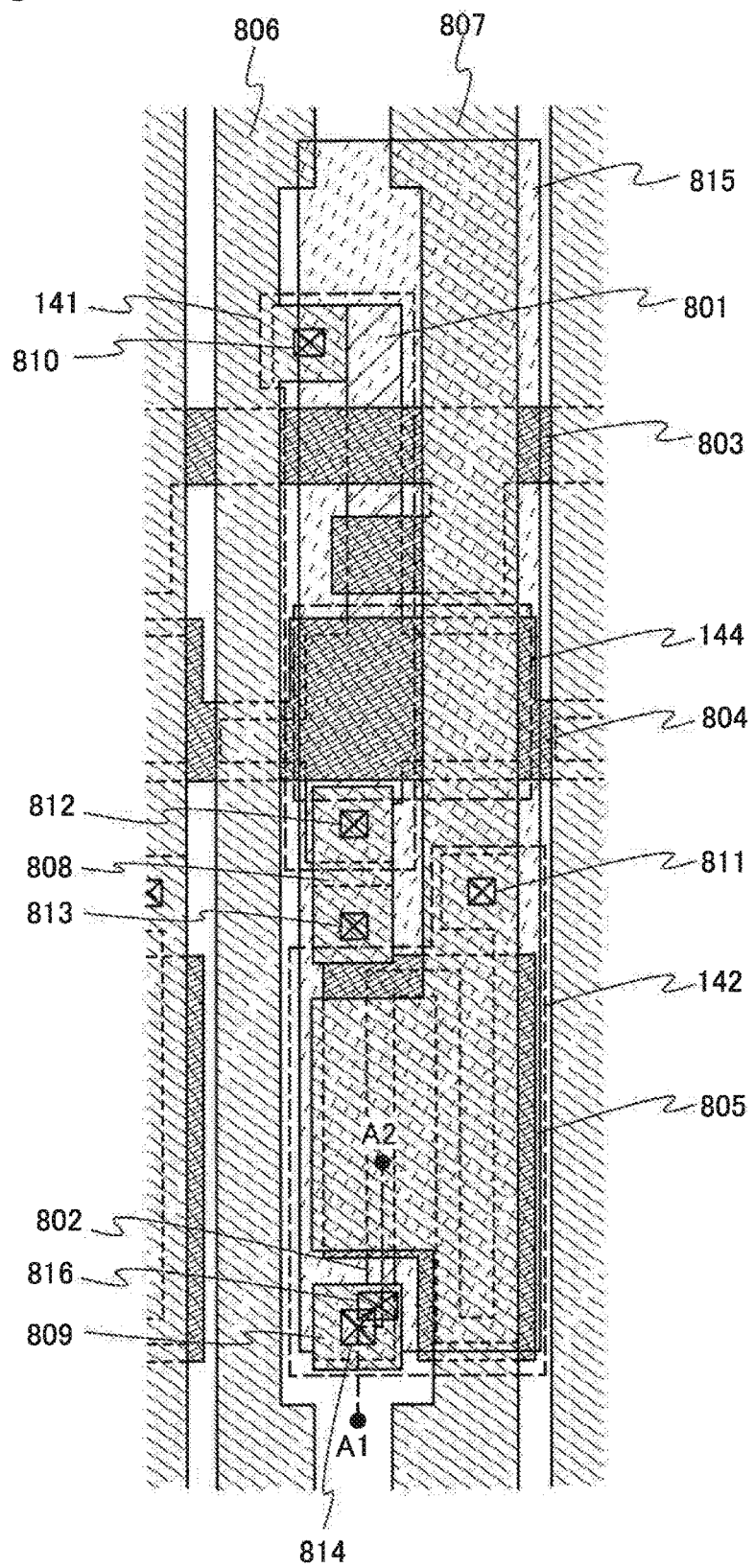
FIG. 8 is a top view of a pixel.

Next, an example of a specific structure of the pixel 140 is described. FIG. 8 shows an example of a top view of the pixel 140. Note that insulating films are omitted in a top view shown in FIG. 8 in order to show the layout of the pixel 140 clearly. Further, an electroluminescent layer and a common electrode that are provided over a pixel electrode are omitted in a top view shown in FIG. 8 in order to show the layout of the pixel 140 clearly.

In FIG. 8, a semiconductor film 801 and a semiconductor film 802 that function as active layers of the transistor 141 and the transistor 142, respectively, are provided over a substrate having an insulating surface. The semiconductor film 801 also functions as one of the electrodes of the storage capacitor 144.

A conductive film 803 that functions as a gate electrode of the transistor 141 and a scan line is provided over the semiconductor film 801 with a gate insulating film interposed therebetween. Further, a conductive film 804 that functions as one of the electrodes of the storage capacitor 144 is provided over the semiconductor film 801 with the gate insulating film interposed therebetween. A portion in which the conductive film 804 overlaps with the semiconductor film 801 with the gate insulating film interposed therebetween corresponds to the storage capacitor 144. Still further, a conductive film 805 that functions as the gate electrode of the transistor 142 is provided over the semiconductor film 802 with the gate insulating film interposed therebetween.

A first interlayer insulating film is formed over the conductive film 803, the conductive film 804, and the conductive film 805. A conductive film 806 that functions as the signal line, a conductive film 807 that functions as a power supply line, a conductive film 808, and a conductive film 809 are provided over the first interlayer insulating film.

The conductive film 806 is connected to the semiconductor film 801 via an opening portion 810 formed in the first interlayer insulating film and the gate insulating film. The conductive film 807 is connected to the semiconductor film 802 via an opening portion 811 formed in the first interlayer insulating film and the gate insulating film. The conductive film 808 is connected to the semiconductor film 802 via an opening portion 812 formed in the first interlayer insulating film and the gate insulating film, and is connected to the conductive film 805 via an opening portion 813 formed in the first interlayer insulating film. The conductive film 809 is connected to the semiconductor film 802 via an opening portion 814 formed in the first interlayer insulating film and the gate insulating film.

A second interlayer insulating film is formed over the conductive film 806, the conductive film 807, the conductive film 808, and the conductive film 809. A conductive film 815 that functions as the pixel electrode is provided over the second interlayer insulating film. The conductive film 815 is connected to the conductive film 809 via an opening portion 816 formed in the second interlayer insulating film.

Note that in a display device according to one embodiment of the present invention, a color filter method in which a color filter and a light-emitting element that emits a single color such as white are used in combination in order to display a full-color image can be employed for the pixel portion 111 shown in FIG. 1. Alternatively, a method in which a full-color image is displayed with the use of a plurality of light-emitting elements emitting light with different hues can be employed. This method is called a separate coloring method because the electroluminescent layer that is provided between a pair of electrodes included in the light-emitting element is separately colored by its corresponding color.

In the case of the separate coloring method, generally, the electroluminescent layer is separately colored by an evaporation method with the use of a mask such as a metal mask. Therefore, the size of the pixel depends on the separate coloring accuracy of the electroluminescent layer. On the other hand, in the case of the color filter method, unlike the separate coloring method, the electroluminescent layer does not need to be separately colored. Accordingly, in the case of the color filter method, as compared to the separate coloring method, the pixel can be easily reduced in size, and the pixel portion with high high-definition can be fabricated. The pixel portion with high high-definition has an advantage in that a sense of depth or stereoscopic effect of an image is increased. Accordingly, in terms of increasing a sense of depth or stereoscopic effect, a light-emitting device formed with the color filter method is more suitable than a light-emitting device with the separate coloring method for a display device according to one embodiment of the present invention.

A bottom emission type light-emitting device in which light of the light-emitting element is extracted from the substrate (element substrate) side or a top emission structure in which light of the light-emitting element is extracted from a side opposite to the element substrate side can be used for a light-emitting device. In the case of a top emission type light-emitting device, light emitted from the light-emitting element is not blocked by a variety of elements such as a wiring, a transistor, or a storage capacitor; therefore, the light-extraction efficiency of light from a pixel of the light-emitting device can be higher than that of a bottom emission type light-emitting device. Accordingly, a top emission type light-emitting device can have high luminance even when the light-emitting element is supplied with low current value, and has an advantage in that the lifetime of the light-emitting element is prolonged.

Further, a display device according to one embodiment of the present invention may have a microcavity (micro optical resonator) structure in which light emitted from an electroluminescent layer is resonated in a light-emitting element. With a microcavity structure, the light-extraction efficiency of light with a particular wavelength from the light-emitting element can be increased, so that the luminance and the color purity of the pixel portion can be improved.

Figure 9:
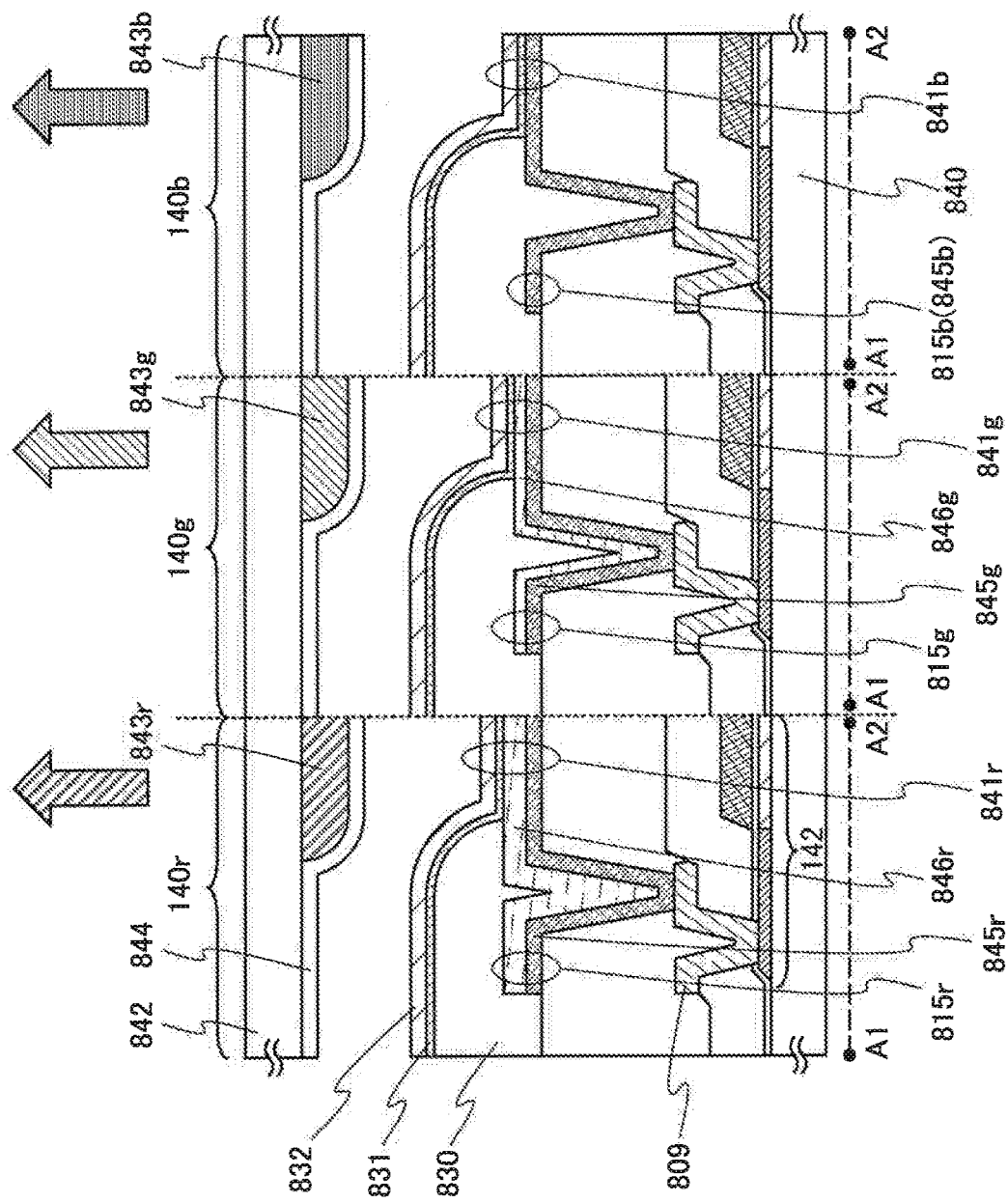
FIG. 9 is a cross-sectional view of a pixel.

FIG. 9 shows an example of a cross-sectional view of a pixel having a microcavity structure. FIG. 9 shows part of the cross section of a pixel emitting red light, part of the cross section of a pixel emitting blue light, and part of the cross section of a pixel emitting green light. Each of the three parts of cross sections of pixels corresponds to a dashed and dotted line A1-A2 in the top view of the pixel 140 shown in FIG. 8.

Specifically, FIG. 9 shows a pixel 140*r* emitting red light, a pixel 140*g* emitting green light, and a pixel 140*b* emitting blue light. The pixel 140*r*, the pixel 140*g*, and the pixel 140*b* include a pixel electrode 815*r*, a pixel electrode 815*g*, and a pixel electrode 815*b*, respectively. The pixel electrode 815*r*, the pixel electrode 815*g*, and the pixel electrode 815*b* are connected to the transistor 142 in the pixel 140*r*, the transistor 142 in the pixel 140*g*, and the transistor 142 in the pixel 140*b*, respectively, via the conductive film 809 over a substrate 840.

A partition wall 830 having an insulating film is provided over each of the pixel electrode 815*r*, the pixel electrode 815*g*, and the pixel electrode 815*b*. The partition wall 830 has an opening portion, and in the opening portion, each of the pixel electrode 815*r*, the pixel electrode 815*g*, and the pixel electrode 815*b* is partly exposed. In order to cover the exposed portions, an electroluminescent layer 831 and a common electrode 832 that transmits visible light are stacked over the partition wall 830 in this order.

A portion in which the pixel electrode 815*r*, the electroluminescent layer 831, and the common electrode 832 overlap with each other corresponds to a light-emitting element 841*r* emitting red light. A portion in which the pixel electrode 815*g*, the electroluminescent layer 831, and the common electrode 832 overlap with each other corresponds to a light-emitting element 841*g* emitting green light. A portion in which the pixel electrode 815*b*, the electroluminescent layer 831, and the common electrode 832 overlap with each other corresponds to a light-emitting element 841*b* emitting blue light.

A substrate 842 faces the substrate 840 with the light-emitting element 841*r*, the light-emitting element 841*g*, and the light-emitting element 841*b* interposed therebetween. A coloring layer 843*r* corresponding to the pixel 140*r*, a coloring layer 843*g* corresponding to the pixel 140*g*, and a coloring layer 843b corresponding to the pixel 140b are formed over the substrate 842. The coloring layer 843r is a layer that has higher transmittance of light in a wavelength region corresponding to red than light in the other wavelength regions. The coloring layer 843g is a layer that has higher transmittance of light in a wavelength region corresponding to green than light in the other wavelength regions. The coloring layer 843b is a layer that has higher transmittance of light in a wavelength region corresponding to blue than light in the other wavelength regions.

Further, an overcoat 844 is provided over the substrate 842 to cover the coloring layer 843r, the coloring layer 843g, and the coloring layer 843b. The overcoat 844 is a layer that transmits visible light, is provided for protecting the coloring layer 843r, the coloring layer 843g, and the coloring layer 843b, and is preferably formed with a resin material having high level of planarity. The combination of the overcoat 844 and any one of the coloring layers 843r, 843g, and 843b may be regarded as a color filter. Further, each of the coloring layer 843r, the coloring layer 843g, and the coloring layer 843b may also be regarded as a color filter.

As shown in FIG. 9, in one embodiment of the present invention, a conductive film 845r with high visible-light reflectance and a conductive film 846r with visible-light transmittance higher than that of the conductive film 845r are stacked in this order and used as the pixel electrode 815r. A conductive film 845g with high visible-light reflectance and a conductive film 846g with visible-light transmittance higher than that of the conductive film 845g are stacked in this order and used as the pixel electrode 815g. The thickness of the conductive film 846g is smaller than that of the conductive film 846r. Further, a conductive film 845b with high visible-light reflectance is used as the pixel electrode 815b.

Accordingly, in a light-emitting device shown in FIG. 9, in the light-emitting element 841r, an optical path length of light emitted from the electroluminescent layer 831 is determined by the distance between the conductive film 845r and the common electrode 832. Further, in the light-emitting element 841g, an optical path length of light emitted from the electroluminescent layer 831 is determined by the distance between the conductive film 845g and the common electrode 832. Still further, in the light-emitting element 841b, an optical path length of light emitted form the electroluminescent layer 831 is determined by the distance between the conductive film 845b and the common electrode 832.

One embodiment of the present invention employs a microcavity structure in which the above optical path length is adjusted in accordance with wavelength of light each corresponding to the light-emitting element 841r, the light-emitting element 841g, and the light-emitting element 841b, so that light emitted from the electroluminescent layer 831 is resonated in the light-emitting element. For example, in FIG. 9, when a distance L is the distance between the common electrode 832 and any one of the conductive films 845r, 845g, and 845b, a refractive index n is the refractive index of the electroluminescent layer 831, and a wavelength λ is the wavelength of light that is expected to resonate, the product of the distance L and the index n is preferably $(2N-1)/4$ times the wavelength λ (N is a natural number).

With the employment of the microcavity structure for one embodiment of the present invention, the intensity of light having a wavelength corresponding to red light in light emitted from the light-emitting element 841r is increased by resonance. Accordingly, the color purity and the luminance of red light obtained through the coloring layer 843r are increased. Further, with the employment of the microcavity structure for one embodiment of the present invention, the intensity of light having a wavelength corresponding to green light in light emitted from the light-emitting element 841g is increased by resonance. Accordingly, the color purity and the luminance of green light obtained through the coloring layer 843g are increased. Still further, with the employment of the microcavity structure for one embodiment of the present invention, the intensity of light having a wavelength corresponding to blue light in light emitted from the light-emitting element 841b is increased by resonance. Accordingly, the color purity and the luminance of blue light obtained through the coloring layer 843b are increased.

FIG. 9 shows a structure in which pixels emitting three colors of red, green, and blue are used; however, one embodiment of the present invention is not limited to the structure. A combination of the colors, which is used in one embodiment of the present invention, may include four colors of red, green, blue, and yellow, or three colors of cyan, magenta, and yellow. Alternatively, the combination of the colors may include six colors of pale red, pale green, pale blue, deep red, deep green, and deep blue. Alternatively, the combination of the colors may be six colors of red, green, blue, cyan, magenta, and yellow.

Note that, for example, colors that can be exhibited using the pixels of red, green, and blue are limited to colors existing in the triangle made by the three points on the chromaticity diagram, which correspond to the emission colors of the respective light sources. Therefore, as in the case where the pixels of red, green, blue, and yellow are used, by additionally providing a light source of a color existing outside the triangle on the chromaticity diagram, the range of the colors which can be expressed in the light-emitting device can be expanded, so that color reproducibility can be enhanced.

In FIG. 9, in the light-emitting element 841b whose wavelength λ of light is the shortest among the light-emitting elements 841r, 841g, and 841b, the conductive film 845b with high visible-light reflectance is use as a pixel electrode. Further, the conductive film 846r and the conductive film 846g that have thicknesses different from each other are used in the light-emitting element 841r and the light-emitting element 841g, respectively, so that the optical path length is adjusted. In one embodiment of the present invention, a conductive film with high visible-light transmittance, such as the conductive film 846r or the conductive film 846g may also be provided over the conductive film 845b with high visible-light reflectance in the light-emitting element 841b whose wavelength λ is the shortest. However, the manufacturing process of the case where the conductive film 845b with high visible-light reflectance is use as a pixel electrode in the light-emitting element 841b whose wavelength λ is the shortest as shown in FIG. 9 is easier and more preferable than the manufacturing process of the case where the conductive film with high visible-light transmittance is used as the pixel electrode in all of the light-emitting elements.

Note that the conductive film 845b with high visible-light reflectance often has smaller work function than the conductive film 846r and the conductive film 846g that have high visible-light transmittance. Therefore, in the light-emitting element 841b whose wavelength λ is the shortest, compared to the light-emitting element 841r and the light-emitting element 841g, hole injection from the pixel electrode 815b which is an anode to the electroluminescent layer 831 is not easily performed, and the emission efficiency of the light-emitting element 841*b* tends to be low. Accordingly, in one embodiment of the present invention, a composite material that contains a substance having a high hole-transport property and a substance having an acceptor (electron-accepting) property with respect to the substance having a high hole-transport property is preferably used as a layer of the electroluminescent layer 831 which is in contact with the conductive film 845*b* with high visible-light reflectance in the light-emitting element 841*b* whose wavelength λ is the shortest. The composite material is formed to be in contact with the pixel electrode 815*b* that is an anode, so that the hole injection from the pixel electrode 815*b* to the electroluminescent layer 831 is easily performed, and the emission efficiency of the light-emitting element 841*b* can be increased.

As the substance having an acceptor property, 7,7,8,8-tetracyano-2,3,5,6-tetrafluoroquinodimethane (abbreviation: $F_4$-TCNQ), chloranil, and the like can be given. Further, a transition metal oxide can be given. In addition, oxides of metals belonging to Groups 4 to 8 in the periodic table can be also given. Specifically, vanadium oxide, niobium oxide, tantalum oxide, chromium oxide, molybdenum oxide, tungsten oxide, manganese oxide, rhenium oxide, or the like is a preferable material because the acceptor property is high. Among these, molybdenum oxide is especially preferable because it is stable in the air, has a low hygroscopic property, and is easily treated.

As the substance having a high hole-transport property used for the composite material, any of a variety of compounds such as an aromatic amine compound, a carbazole derivative, aromatic hydrocarbon, or a high molecular compound (e.g., an oligomer, a dendrimer, or a polymer) can be used. The organic compound used for the composite material is preferably an organic compound having a high hole-transport property. Specifically, a substance having a hole mobility of $10^{-6}$ cm$^2$/Vs or higher is preferably used. However, substances other than the above described materials may also be used as long as the substances have higher hole-transport properties than electron-transport properties.

Each of the conductive film 845*r*, the conductive film 845*g*, and the conductive film 845*b* which have high visible-light reflectance can be formed using a single layer or a stacked layer using aluminum, silver, an alloy containing such a metal material, or the like. Alternatively, each of the conductive film 845*r*, the conductive film 845*g*, and the conductive film 845*b* can be formed by stacking a conductive film with high visible-light reflectance and a conductive film with a small thickness (preferably 20 nm or less, more preferably 10 nm or less). For example, a thin titanium film or a thin molybdenum film is stacked over the conductive film with high visible-light reflectance to form the conductive film 845*b*, so that an oxide film can be prevented from being formed over the surface of the conductive film with high visible-light reflectance (e.g., an aluminum film, an alloy film containing aluminum, or a silver film).

As the conductive films 846*r* and 846*g* that have high visible-light transmittance, for example, indium oxide, tin oxide, zinc oxide, indium tin oxide, or indium zinc oxide can be used.

The common electrode 832 can be formed by stacking a conductive film with a thickness thin enough to transmit light (preferably 20 nm or less, more preferably 10 nm or less) and a conductive film containing a conductive metal oxide. The conductive film with a thickness thin enough to transmit light can be formed using a single layer or a stacked layer using silver, magnesium, an alloy containing such a metal material, or the like. As the conductive metal oxide, it is possible to use indium oxide, tin oxide, zinc oxide, indium oxide-tin oxide, indium oxide-zinc oxide, or any of these metal oxide materials containing silicon oxide.

Figure 10:
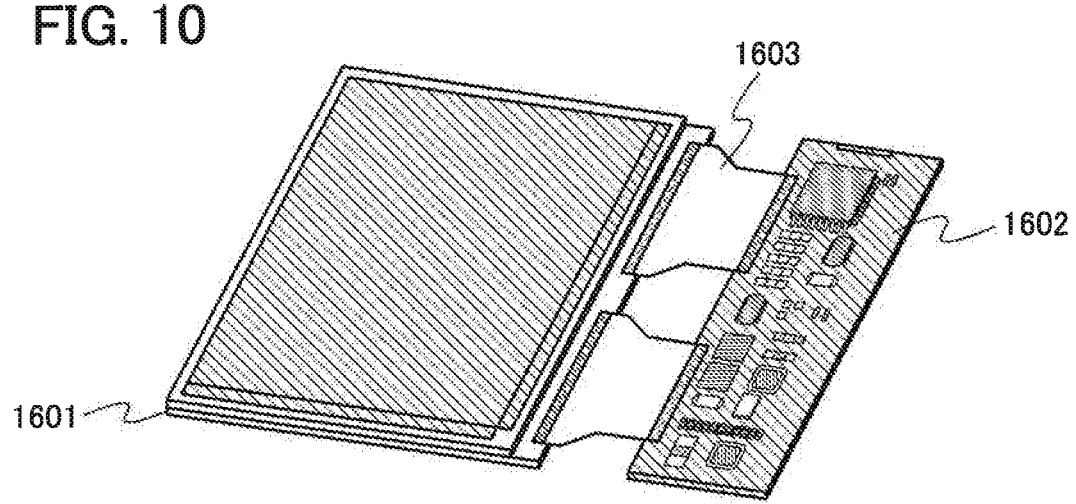
FIG. 10 is a perspective view of a display device.

Next, FIG. 10 shows an example of a perspective view of a display device according to one embodiment of the present invention. FIG. 10 illustrates a display device in which a light-emitting device is used in a display portion.

The display device shown in FIG. 10 includes a display portion 1601, a circuit substrate 1602, and a connecting portion 1603.

The circuit substrate 1602 is provided with an image-processing portion, and a variety of signals or a power supply potential is input to the display portion 1601 via the connecting portion 1603. As the connecting portion 1603, a flexible printed circuit (FPC) or the like can be used. In the case where a COF tape is used as the connecting portion 1603, part of the circuit of the image-processing portion or part of the driver circuit included in the display portion 1601 is formed on a chip separately prepared, and the chip may be connected to a COF tape by a COF (chip on film) method.

This embodiment can be implemented in combination with the above embodiments.

EXAMPLE

A display device according to one embodiment of the present invention can display an image with a high sense of depth or high stereoscopic effect. Specifically, the display device according to one embodiment of the present invention can be applied to image display devices, laptop computers, or image reproducing devices provided with recording media (typically devices that reproduce the content of recording media such as digital versatile discs (DVDs) and have displays for displaying the reproduced images). In addition to the above examples, as an electronic device including the display device according to one embodiment of the present invention, mobile phones, portable game machines, portable information terminals, e-book readers, video cameras, digital still cameras, goggle-type displays (head mounted displays), navigation systems, audio reproducing devices (e.g., car audio components and digital audio players), copiers, facsimiles, printers, multifunction printers, automated teller machines (ATM), vending machines, and the like can be given. Specific examples of such electronic appliances are shown in FIGS. 11A to 11C.

Figure 11A:
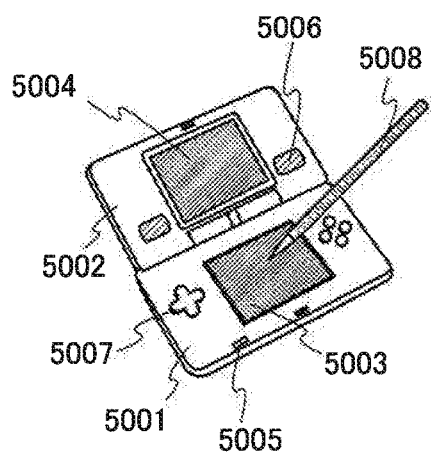
FIGS. 11A to 11C each show an electronic device.

FIG. 11A illustrates a portable game machine including a housing 5001, a housing 5002, an image display portion 5003, an image display portion 5004, a microphone 5005, speakers 5006, operation keys 5007, a stylus 5008, and the like. The display device according to one embodiment of the present invention can be used as the image display portion 5003 or the image display portion 5004. The portable game machine is capable of displaying an image with a high sense of depth or high stereoscopic effect when a display device according to one embodiment of the present invention is used as the image display portion 5003 or 5004. Note that although the portable game machine in FIG. 11A has the two image display portions 5003 and 5004, the number of image display portions included in the portable game machine is not limited to two.

Figure 11B:
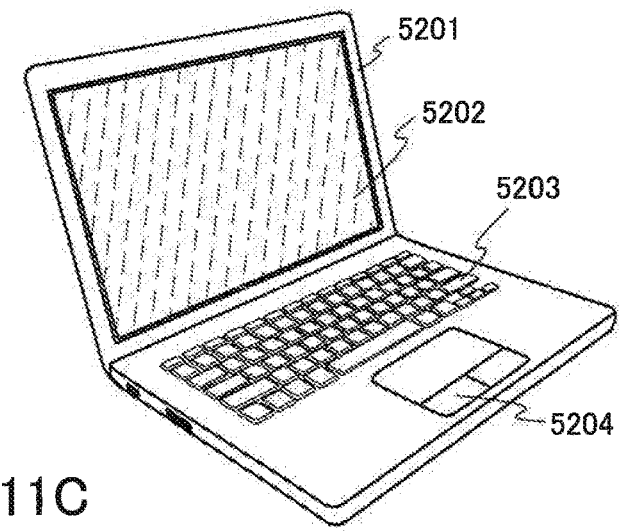

FIG. 11B illustrates a laptop, which includes a housing 5201, an image display portion 5202, a keyboard 5203, a pointing device 5204, and the like. The display device according to one embodiment of the present invention can be used for the image display portion 5202. The laptop personal computer is capable of displaying an image with a high sense of depth or high stereoscopic effect when a display device according to one embodiment of the present invention is used as the image display portion 5202.

Figure 11C:
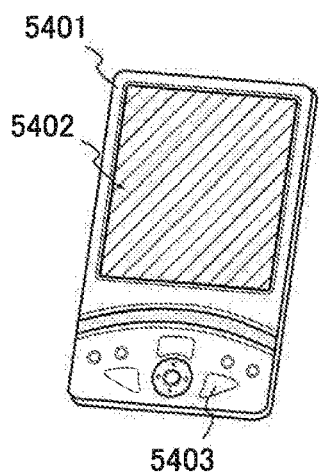

FIG. 11C illustrates a portable information terminal, which includes a housing 5401, an image display portion 5402, operation keys 5403, and the like. The display device according to one embodiment of the present invention can be used as the image display portion 5402. The portable information terminal is capable of displaying an image with a high sense of depth or high stereoscopic effect when a display device according to one embodiment of the present invention is used as the image display portion 5402.

As described above, the present invention can be widely applied to and used in electronic devices in a wide variety of fields.

This embodiment can be implemented in combination with embodiments above mentioned.

This application is based on Japanese Patent Application serial No. 2011-067069 filed with Japan Patent Office on Mar. 25, 2011, the entire contents of which are hereby incorporated by reference.

What is claimed is:

1. An image processing method comprising the steps of:
separating first image data of an image into image data of a first object, image data of a second object, and image data of background;
obtaining data of a size of the first object and a size of the second object;
processing the image data of the first object to obtain an enlarged image data of the first object;
processing the image data of the second object to obtain an enlarged image data of the second object; and
combining the enlarged image data of the first object and the enlarged image data of the second object with the image data of the background to generate second image data,
wherein the size of the first object is enlarged in the second image data,
wherein the size of the second object is enlarged in the second image data, and
wherein a magnification rate of the first object is higher than a magnification rate of the second object.

2. The image processing method according to claim 1, further comprising the step of obtaining a feature amount with data stored in a database.

3. The image processing method according to claim 1, wherein the processing step and the combination step are carried on so that a sense of depth or stereoscopic effect of an image formed from the second image data is increased compared to a sense of depth or stereoscopic effect of an image formed from the first image data.

4. An image processing method comprising the steps of:
separating first image data of an image into image data of a first object, image data of a second object, and image data of background;
obtaining data of the first object and data of the second object;
processing the image data of the first object to change a degree of an exaggeration of an outline of the first object;
processing the image data of the second object to change a degree of an exaggeration of an outline of the second object; and
combining the image data of the first object after the processing the image data of the first object and the image data of the second object after the processing the image data of the second object with the image data of the background to generate second image data,
wherein the degree of the exaggeration of the outline of the first object is larger than the degree of the exaggeration of the outline of the second object.

5. The image processing method according to claim 4, further comprising the step of obtaining a feature amount with data stored in a database.

6. The image processing method according to claim 4, wherein the processing step and the combination step are carried on so that a sense of depth or stereoscopic effect of an image formed from the second image data is increased compared to a sense of depth or stereoscopic effect of an image formed from the first image data.

7. An image processing method comprising the steps of:
extracting image data of a first object and a second object from first image data;
obtaining data of the first object and the second object;
processing the image data of the first object and the second object to change a degree of an exaggeration of an outline of one of the first object and the second object; and change a size of the one of the first object and the second object; and
combining the image data of the first object and the second object after the processing with the image data of a background of the first image data to generate second image data.

8. The image processing method according to claim 7, further comprising the step of obtaining a feature amount with data stored in a database.

9. The image processing method according to claim 7, further comprising the step of determining a front-back relation between the first object and the second object.

10. The image processing method according to claim 7, wherein the processing step and the combination step are carried on so that a sense of depth or stereoscopic effect of an image formed from the second image data is increased compared to a sense of depth or stereoscopic effect of an image formed from the first image data.

11. The image processing method according to claim 7, wherein the one of the first object and the second object is enlarged compared to the other of the first object and the second object.

12. The image processing method according to claim 7, wherein the outline of the one of the first object and the second object which is determined to be more on the front side of the image are reinforced compared to the outline of the other of the first object and the second object which is determined to be more on a back side of the image.

13. The image processing method according to claim 7, wherein a distance between a vanishing point and a center point of the one of the first object and the second object which is determined to be more on the front side of the image is lengthened compared to a distance between the vanishing point and a center point of the other of the first object and the second object which is determined to be more on a back side of the image.

* * * * *